United States Patent
Kojima et al.

(10) Patent No.: US 9,128,242 B2
(45) Date of Patent: Sep. 8, 2015

(54) MODE-EVOLUTION COMPOUND CONVERTER

(75) Inventors: Keisuke Kojima, Weston, WA (US); Wangqing Yuan, South Bend, IN (US); Bingnan Wang, Boston, MA (US); Eiji Yagyu, Tokyo (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 428 days.

(21) Appl. No.: 13/327,642

(22) Filed: Dec. 15, 2011

(65) Prior Publication Data

US 2013/0156361 A1    Jun. 20, 2013

(51) Int. Cl.
*G02B 6/26* (2006.01)
*G02B 6/42* (2006.01)
*G02B 6/14* (2006.01)
*G02B 6/122* (2006.01)

(52) U.S. Cl.
CPC .............. *G02B 6/14* (2013.01); *G02B 6/1228* (2013.01)

(58) Field of Classification Search
USPC .......................................................... 385/28
See application file for complete search history.

(56) References Cited

U.S. PATENT DOCUMENTS

| | | | |
|---|---|---|---|
| 5,285,507 A * | 2/1994 | Van der Tol | 385/11 |
| 5,418,867 A | 5/1995 | Van Der Tol | |

FOREIGN PATENT DOCUMENTS

| | | |
|---|---|---|
| JP | 05-196830 A | 6/1993 |
| JP | 06-289242 | 10/1994 |
| JP | 10-073792 | 3/1998 |
| JP | 2006-235380 | 7/2006 |
| JP | 2006-517673 A | 7/2006 |
| JP | 2008-066703 | 3/2008 |

OTHER PUBLICATIONS

Dai et al., Novel concept for ultracompact polarization splitter-rotator based on silicon nanowires, May 23, 2011, Optical society of America, vol. 19 No. 11, pp. 1094010949.*

Daoxin Dai et al. "Novel Concept for Ultracompact Polarization Splitter-Rotator Based on Silicon Nanowires;" published May 20, 2011; vol. 19, No. 11, Optics Express 10940.

* cited by examiner

*Primary Examiner* — Mike Stahl
*Assistant Examiner* — Kajli Prince
(74) *Attorney, Agent, or Firm* — Dirk Brinkman; Gene Vinokur

(57) ABSTRACT

A mode-evolution compound converter for processing an optical signal that includes a first component having a fundamental transverse magnetic (TM) mode and a second component having a fundamental transverse electric (TE) mode is disclosed. The compound converter includes a set of multiple converters connected to form a compound converter, wherein each converter is a mode-evolution converter selected from a group including a polarization converter, a spatial converter, and combination thereof, wherein the polarization converter at least converts a mode of a polarization of at least one component of the optical signal, and the spatial mode converter at least converts a spatial mode order of at least one component of the optical signal.

17 Claims, 16 Drawing Sheets

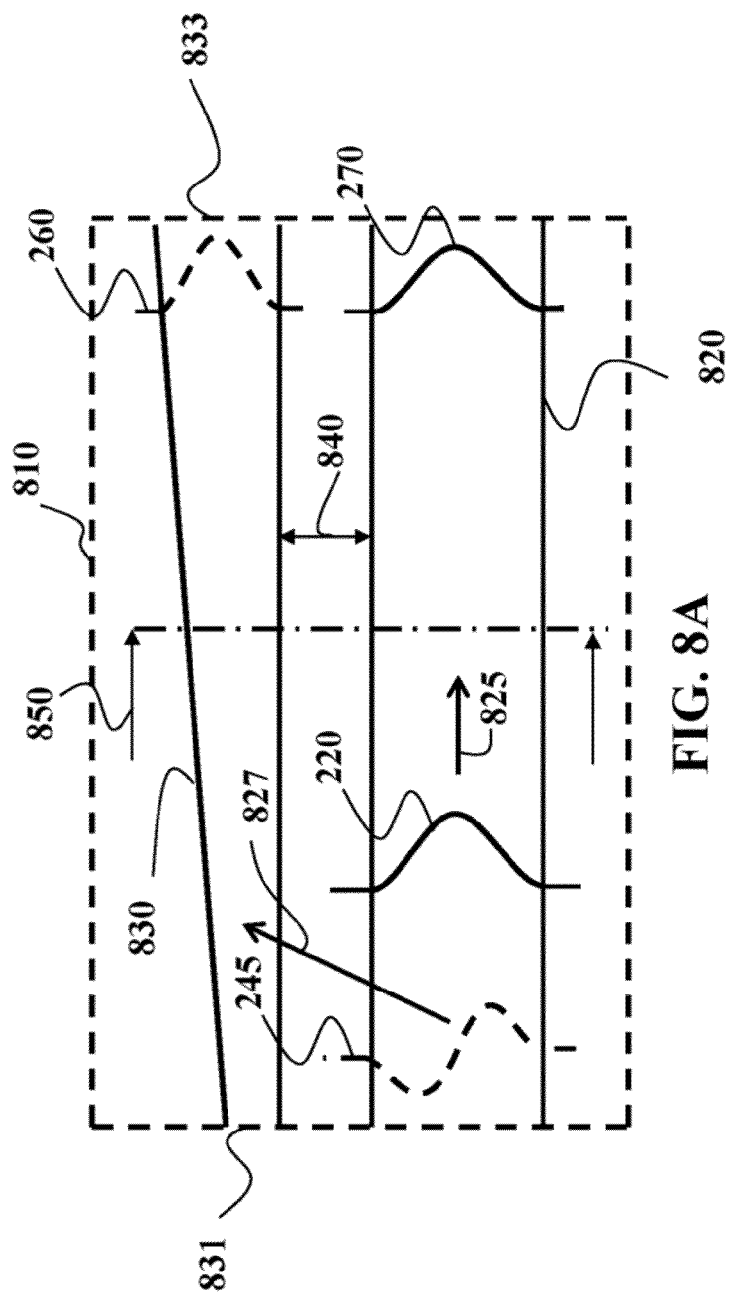

900

1000

1300

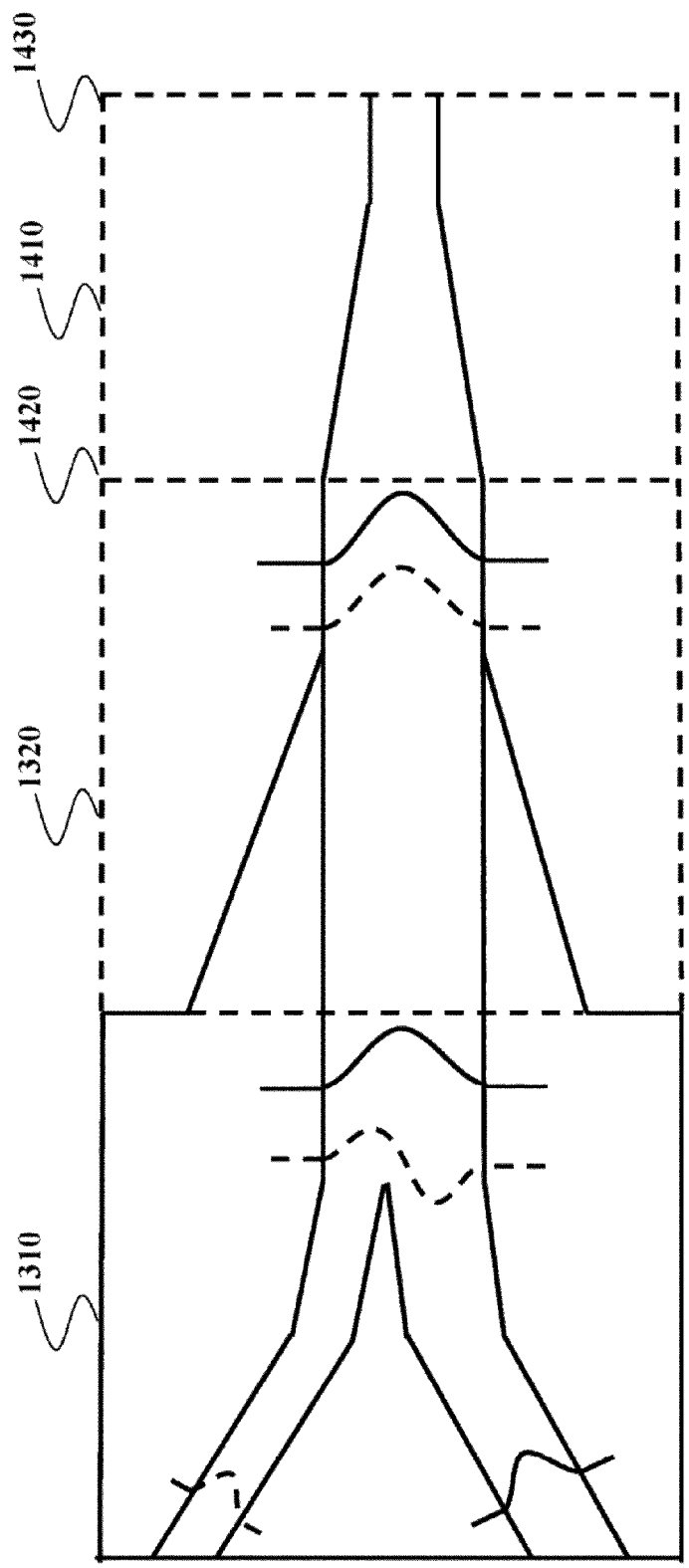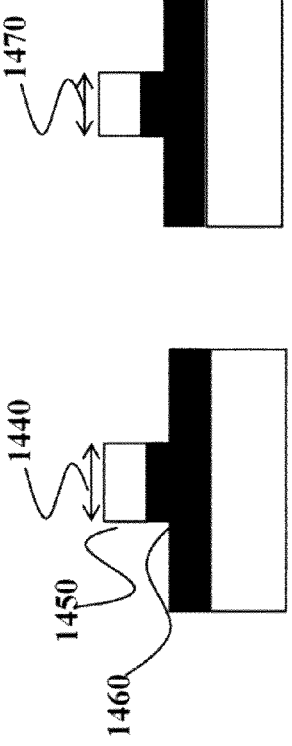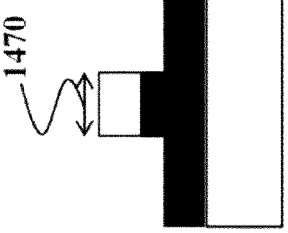

1500

MODE-EVOLUTION COMPOUND CONVERTER

FIELD OF THE INVENTION

This invention relates generally to optical converters, and more particularly to compound optical converters for polarization and spatial mode conversion of an optical signal.

BACKGROUND OF THE INVENTION

Controlling a polarization mode and a spatial mode of optical signals in photonic integrated circuits (PICs) is important for a fiber optical communication network. For example, a conventional single mode fiber that can be used in the network does not preserve the polarization mode. When the optical signal is coupled from the single mode fiber to the PICs, the signal decomposes into arbitrary compositions of two orthogonal polarization components, namely, a first component in a transverse electric (TE) mode and a second component in a transverse magnetic (TM) mode. In many modules used in the PICs, the components in the TE and TM modes exhibit different characteristics. For example, the components having different TE and TM modes propagate at different velocities in a high index contrast waveguide, and the energy coupling coefficients of a microring resonator for the TE and TM modes are different.

These polarization-dependent effects degrade the performances of the PICs, especially for high speed communication. Also, most optical communication networks use only one polarization mode. Furthermore, if the components in both polarization modes are used in polarization-division multiplexing (PDM) systems, the spectral efficiency of such systems can be increased.

In addition to the polarization modes, the optical signal and/or each component of the optical signal can have various spatial mode orders. For example, a signal in a fundamental mode order has a lowest propagation loss in the waveguide.

Typically, systems for controlling polarization of optical signals, e.g., polarization transparent systems and polarization multiplexing systems, use polarization converters and/or polarization splitters. The systems for controlling spatial order mode include a multi-mode interference coupler, a directional coupler, and a Y-shaped coupler. In general, the converters can be categorized as two types, i.e., mode-coupling converters and mode-evolution converters.

The mode-coupling converters are typically composed of two waveguides with different geometries connected via an abrupt junction transition. The mode-coupling uses beating behaviors between a pair of waveguide modes in the second waveguide excited by a specific mode in the first waveguide. The beating is due to the combination of two slightly unequal frequencies produces a "beat", resulting from the tones cycling in and out of phase with each other. The mode beating behavior is determined by geometry of the device and operating wavelength of the signal. Therefore, the mode-coupling converters are inherently sensitive to variations in the fabrication process, and wavelength dependent.

The mode-evolution converters replace the abrupt transition with gradual variation of the waveguide geometries along the wave propagation direction. Along the converter, a mode in the first waveguide can evolve into another mode in the second waveguide with different polarization and spatial distribution without exciting other modes in the second waveguide. Compared with mode-coupling converters, the mode-evolution converter has a longer length, a larger bandwidth and a better tolerance to fabrication variations.

Unfortunately, it is not always possible to achieve polarization control and spatial mode control with one type of converter. For example, a mode-evolution polarization converter for transforming a signal in the fundamental TM mode ($TM_0$) into the signal in the fundamental TE mode ($TE_0$) is complicated and requires, e.g., asymmetric bi-level tapers to be used to achieve geometry asymmetry in both horizontal and vertical direction. Such converter has a small tolerance to fabrication variations. Therefore, different converters, which can control the polarization and spatial mode order individually, are often combined into compound converter. However, the compound converter also has a number of fabrication and configuration problems. For example, a polarization converter and a spatial converter may have different epitaxial-grown or etched structures, which are difficult to realize in a simple fabrication process.

Accordingly, conventional solution includes combination of mode-evolution and mode-coupling converters. For example, one conventional converter includes a deep etched width taper, i.e., in the mode-evolution converter, connected to directional coupler, i.e., the mode-coupling converter. Another converter includes a constant width waveguide, i.e., a mode-coupling converter connected to asymmetric Y-coupler, i.e., mode-evolution converter. As an advantage, such converters can have a relatively small length. However, a mode-evolution device in series with a mode-coupling device does not preserve the benefits of using the mode-evolution device, such as the larger bandwidth and the fabrication tolerance, though using mode-coupling based converter may reduce the total device length.

Accordingly, there is a need to design an optical converter that has a large bandwidth and is simple in fabrication.

SUMMARY OF THE INVENTION

It is an object of the invention to provide a method and a system for converting an optical signal and for controlling polarization and spatial modes of the signal. It is further object of the invention to provide a converter that has a large bandwidth and is simple to fabricate.

It is further object of the invention to provide an evolution-compound converter having an accuracy tolerance during the fabrication process. It is another object of the invention to provide such a compound converter that includes various combinations of polarization and spatial converters.

Some embodiments of the invention are based on a realization that instead of combining mode-evolution and mode-coupled converters to achieve a desired conversion, a set of only mode-evolution-based converters can be used to achieve the desired result. Moreover, the mode-evolution-based converters can be selected from a group consisting of a polarization converter, a spatial converter, and combination thereof. Because mode-evolution-based compound converters are inherently broadband and fabrication-tolerant, the above objectives are achieved. The separated stages for polarization and spatial mode order control respectively control characteristics of the signal.

One embodiment discloses a mode-evolution compound converter for processing an optical signal that includes a first component having a fundamental transverse magnetic (TM) mode and a second component having a fundamental transverse electric (TE) mode. The compound converter includes a set of multiple converters connected to form a compound converter, wherein each converter is a mode-evolution converter selected from a group including a polarization converter, a spatial converter, and combination thereof, wherein the polarization converter at least converts a mode of a polarization of at least one component of the optical signal, and the spatial-mode converter at least converts a spatial mode order of at least one component of the optical signal.

Another embodiment discloses a mode-evolution-based compound converter for converting an optical signal including a first component having a fundamental transverse magnetic (TM) mode and a second component having a fundamental transverse electric (TE) mode, including a polarization converter for converting the fundamental TM mode of the first component into a second order TE mode; and a spatial converter for converting the second order TE mode of the first component into the fundamental TE mode and for splitting the first and the second components of the optical signal into a first TE mode signal and a second TE mode signal.

Yet another embodiment discloses a mode-evolution compound converter for processing an optical signal, wherein the optical signal includes a component having a fundamental transverse magnetic (TM) mode, comprising: a set of multiple converters connected to form a compound converter, wherein each converter is a mode-evolution-based converter selected from a group including a polarization converter, a spatial converter, a reverse polarization converter, a reverse spatial converter and combination thereof, wherein the polarization converter and the reverse polarization converter at least converts a mode of a polarization of at least one component of the optical signal, and the spatial mode converter and the reverse spatial mode converter at least converts a spatial mode order of at least one component of the optical signal.

BRIEF DESCRIPTION OF THE DRAWINGS

FIGS. 8A-B are schematics of a spatial mode converter according to another embodiment of the invention;

FIGS. 14A-C is a schematic of a compound converter using a high-order mode filter according one embodiment of the invention;

DETAILED DESCRIPTION OF THE PREFERRED EMBODIMENT

Figure 1:
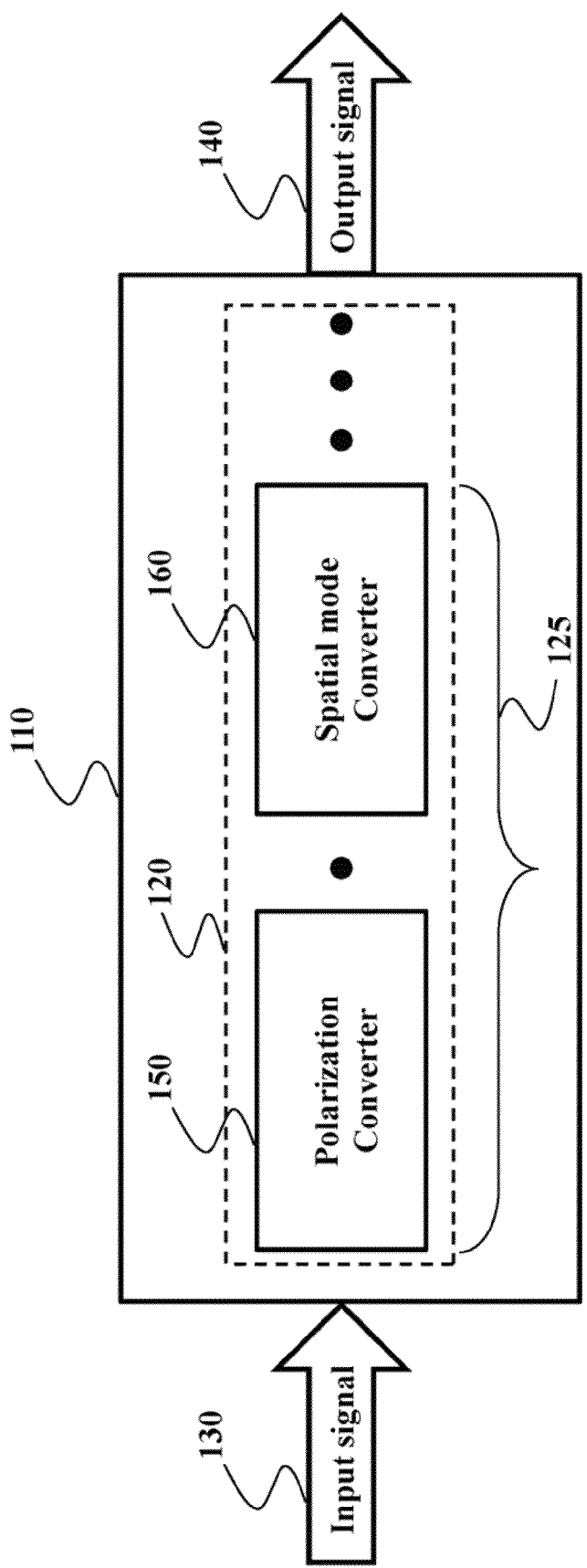
FIG. 1 is a block diagram of a mode-evolution compound converter according to some embodiments of an invention.

FIG. 1 shows a mode-evolution compound converter 110 for processing an input signal 130 according to some embodiments of the invention. Typically, the input signal 130 is a signal, e.g., an optical signal, having at least one of a first component having a fundamental transverse magnetic (TM) mode and a second component having a fundamental transverse electric (TE) mode. An output signal 140 includes one or multiple optical signals. The output signal can have components different from the components of the input signal. Additionally or alternatively, the output signal can include several optical signals, each having one or several components.

The mode-evolution compound converter 110 converts the input signal into the output signal. The converter 110 is formed by a set 120 of multiple mode-evolution converters selected from a group 125 consisting of a polarization converter 150, a spatial converter 160, and combination thereof.

The embodiments of the invention are based on a realization that instead of combining mode-evolution and mode-coupled converters to achieve a desired conversion of the input signal, a set of only mode-evolution converters can be used to produce the desired output signal. Because a mode-evolution is inherently broadband and tolerant to variations in the fabrication process, the mode-evolution compound converter also has a large bandwidth and is simpler to fabricate. Also, because the converter 110 is compound, i.e., the converter includes multiple converters, the fabrication of such converter is simplified. In one embodiment, the compound converter is constructed using optical waveguides structures, which are used as components of photonic integrated circuits (PICs).

Figure 2:
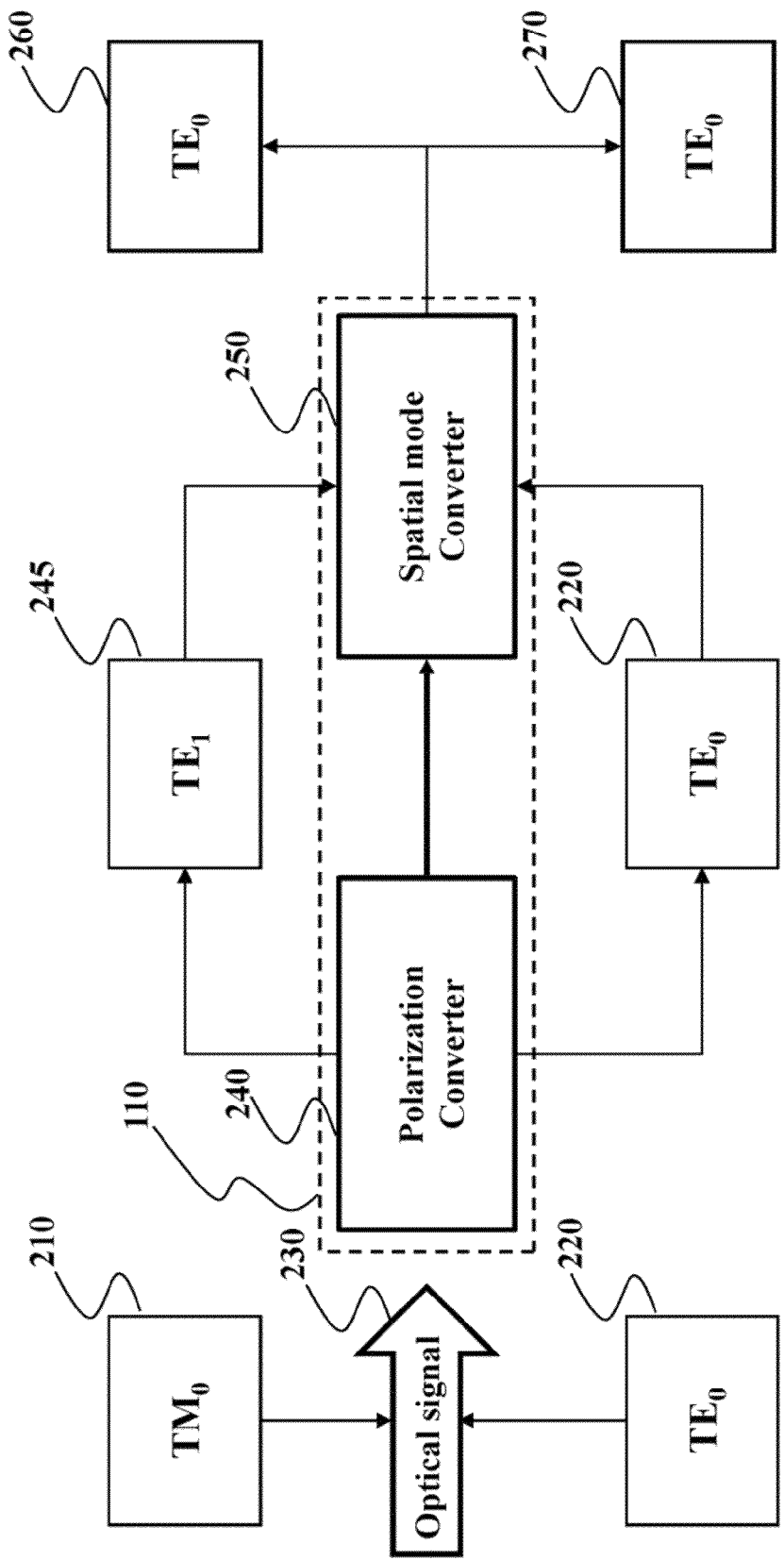
FIG. 2 is a block diagram of a method for processing an optical signal using the compound converter according an embodiment of the invention.

FIG. 2 shows a block diagram of processing an optical signal 230 using the compound converter 110 according one embodiment of the invention. The optical signal 230 includes a first component 210 having a fundamental transverse magnetic (TM) mode and a second component 220 having a fundamental transverse electric (TE) mode. The optical signal is the input to the compound converter 110, which includes a polarization converter 240 and a spatial mode converter 250.

The compound converter can be implemented as an epitaxial-grown structure having a substrate, a core and a cladding layers, as shown below. For example, in one embodiment, the compound converter is an indium phosphide (InP)/indium gallium arsenide phosphide (InGaAsP) structure, which includes an InP substrate, an InGaAsP core layer with As composition of, e.g., 60% lattice matched to InP, and InP cladding layer. In another embodiment, the compound converter is a gallium arsenide (GaAs)/aluminum gallium arsenide (AlGaAs). Other variations are possible and within the scope of the embodiments of the invention.

The polarization converter 240 converts the fundamental TM mode of the first component into a second order TE mode 245, without changing the mode of the second component. The spatial converter 250 converts the second order TE mode of the first component into the fundamental TE mode and splits the first and the second components of the optical signal into a first TE mode signal 260 and a second TE mode signal 270. In this embodiment, the spatial mode converter 250 is both the spatial converter and splitter, and the output signal 140 is represented by two different signals each having only one component having the fundamental TE mode. However, other variations components of the compound converter and/or input and output signals are possible.

Polarization Converter

The mode-evolution polarization converters convert or rotate the polarization of the signal, e.g., from TM mode into TE mode or vice versa.

Figure 3:
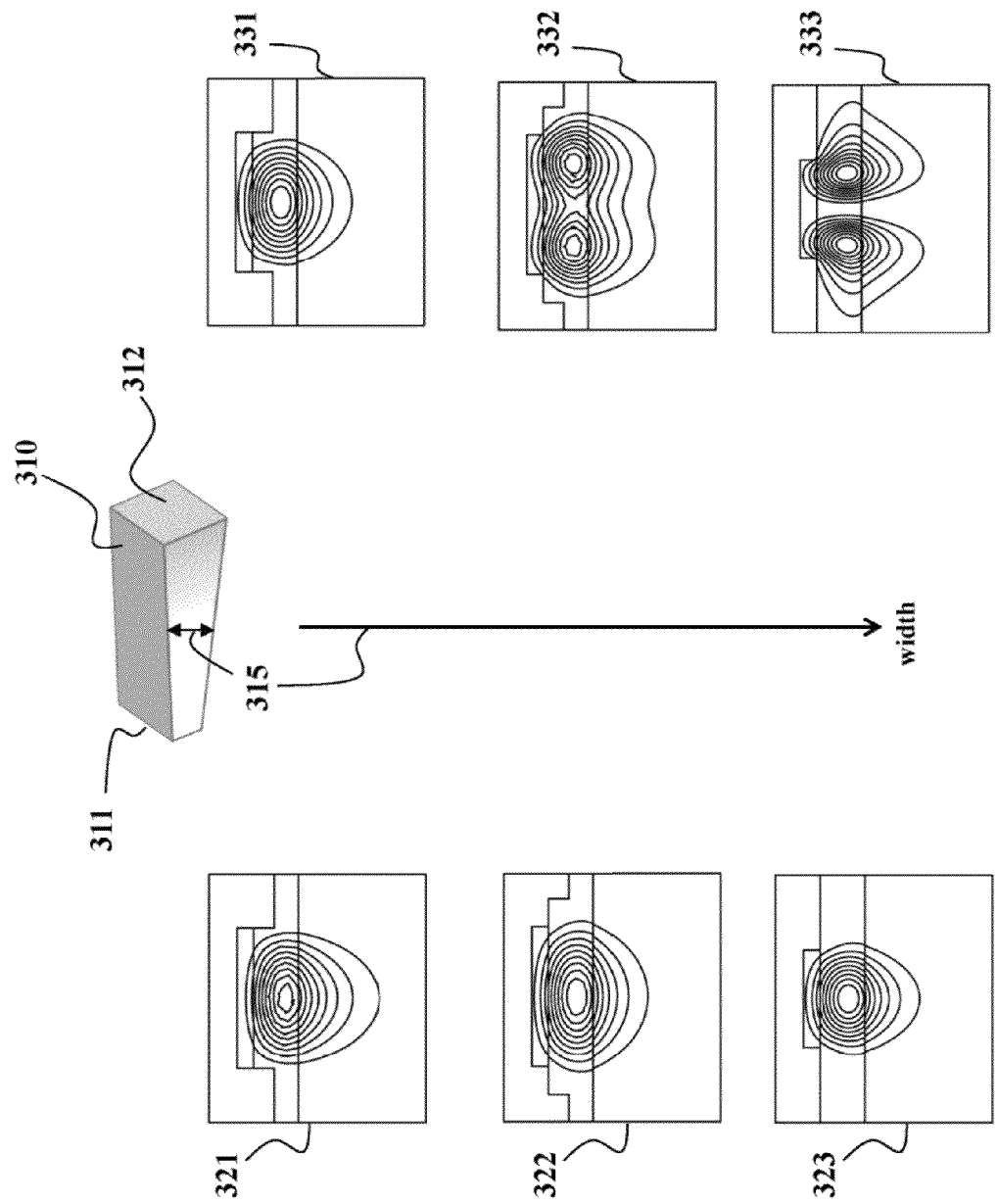
FIG. 3 is block diagram of mode evolutions in a polarization converter.

FIG. 3 shows an example of the polarization converter. In this example, the polarization converter is a waveguide 310 having gradual variation of geometries along the direction of wave propagation. The waveguide 310 is tapered with a width 315 increased from an input side 311 to an output side 312 of the waveguide.

Along the converter, a mode of the first component of the optical signal evolves into another mode with different polarization and spatial distribution without exciting other components of the optical signal. FIG. 3 shows the field intensity evolution in the polarization converter 310 independent of the width 315. In this polarization converter, the fundamental $TE_0$ mode 321-323 of one component is preserved. However, the fundamental $TM_0$ mode 331 of the other component is transformed into a first order $TE_1$ mode 333.

Specifically, at the input of the tapered waveguide, an effective index of $TM_0$ mode is far beyond the effective index of $TE_1$ mode. As the width of the waveguide increases, the index difference between the $TE_1$ and the $TM_0$ becomes smaller. Due to the structural asymmetry in the direction of the wave propagation, these two modes interact with each other and form a hybrid $TM_0+TE_1$ mode 332. The $TM_0$ evolves into the hybrid mode with larger index. The plot 332 shows the hybrid mode with 50% $TM_0$ and 50% $TE_1$. With a further increase of the width of the waveguide, the index difference starts to increase and the two hybrid mode decouples. As a result, the hybrid mode originated from $TM_0$ mode 331 evolves into the $TE_1$ mode 333.

Figure 4A:
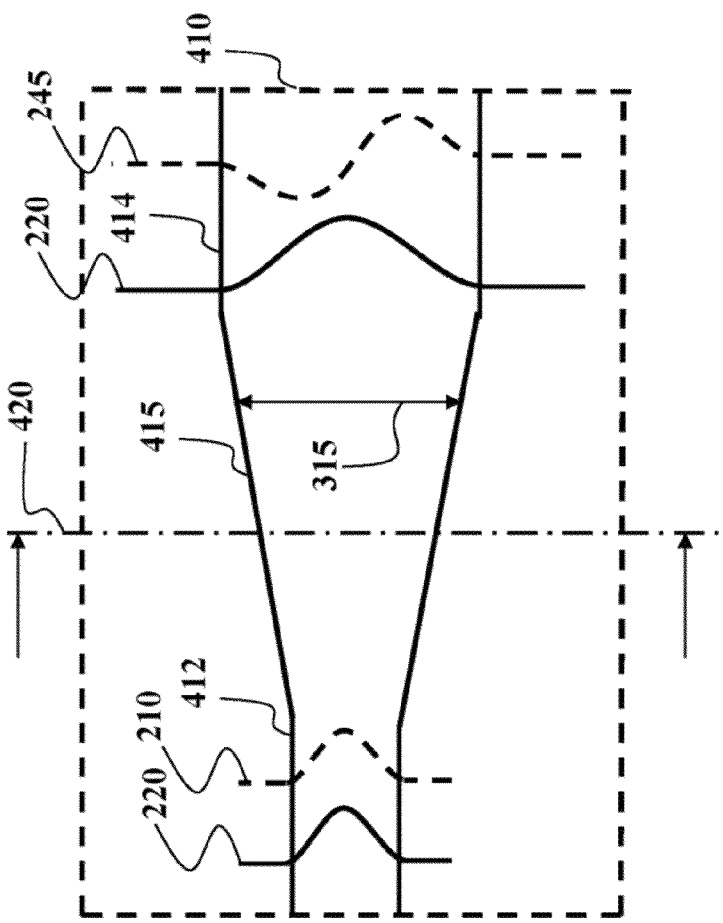
FIGS. 4A-B are schematics of a polarization converter according to one embodiment of the invention.

FIG. 4A shows an example of the polarization converter 410 according one embodiment of the invention. The polarization converter 410 includes a tapered section 415 for converting $TM_0$ mode 210 of the component of the optical signal into the $TE_1$ mode 245. The tapered section of the converter has a varying width 315, which facilitates conversion of the $TM_0$ mode via the $TM_0$-$TE_1$ hybrid mode with higher index into the $TE_1$ mode. The polarization converter 410 can also optionally include sections 412 and/or 414 of a constant width.

Figure 4B:
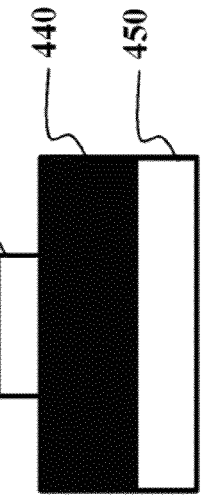

FIG. 4B shows a cross section of the polarization converter 410 according to the line 420. In this embodiment, the polarization converter is a waveguide that includes a core layer 440, a cladding layer 430 and a substrate 450. In one variation of this embodiment, the section 415 is a shallow etched width taper, which is narrower at the input side and wider at the output side. The shallow edge width taper can achieve the identical $TM_0$ to $TE_1$ conversion efficiency with a less length than a deeply etched width taper.

Figure 5A:
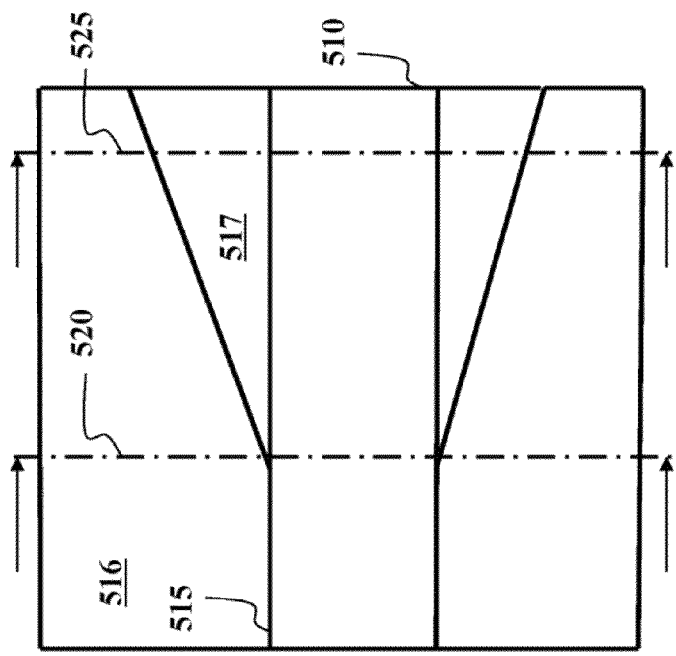
FIGS. 5A-C are schematics of a polarization converter according to another embodiment of the invention.

FIG. 5A shows an example of the polarization converter 510 according to another embodiment of the invention. The polarization converter 510 includes bi-level taper 515 having a deeper etched input waveguide area 516 and shallow etched output waveguide area 517 for converting $TM_0$ mode 210 of the component of the optical signal into the $TE_1$ mode 245.

As with the embodiment 410, the bi-level taper includes a core layer 540, a cladding layer 530 and a substrate layer 550.

Figure 5C:
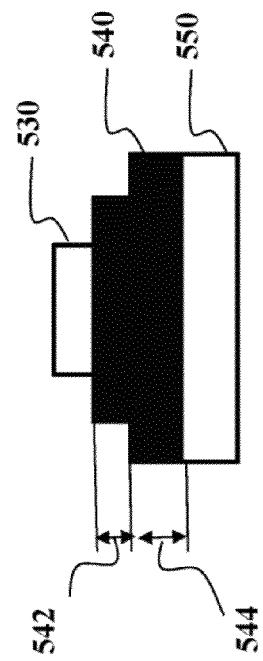
Figure 5B:
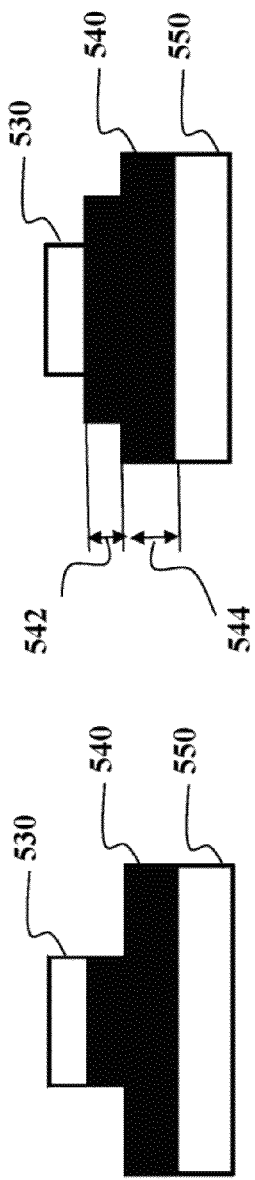

FIG. 5B shows a cross-section of the bi-level taper according the line 520.

FIG. 5C shows a cross-section of the bi-level taper according the line 525. The taper with a constant (or increased) upper layer waveguide width and increased low layer waveguide width from input to output forms the gradual transitions from the input waveguide geometry to the output waveguide geometry. The etch depth of the input waveguide makes the effective index of $TM_0$ mode larger than that of $TE_1$. The etch depth of the output waveguide makes the effective index of $TE_1$ mode larger than that of $TM_0$. Along the propagation direction, the $TM_0$ mode gradually evolves into $TE_1$ mode. This embodiment combines the benefits of shallow etch and deep etch structures of waveguides, and has short device length with good mode control.

Figure 6:
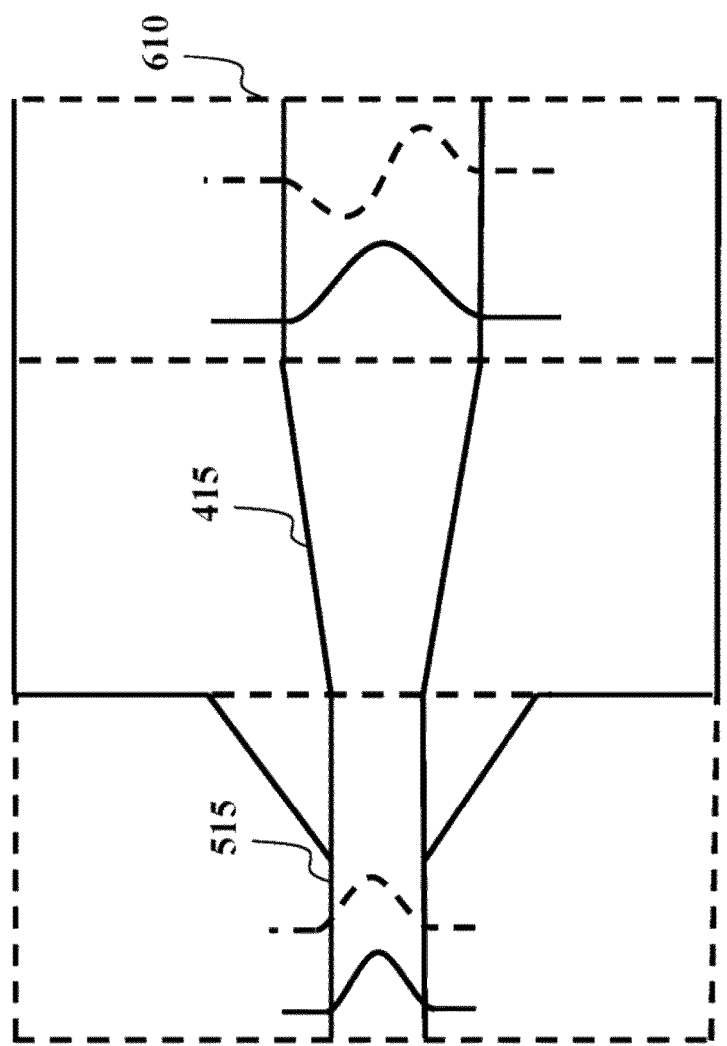
FIG. 6 is a schematic of a compound polarization converter according to one embodiment of the invention.

FIG. 6 shows a compound polarization converter 610 that includes multiple polarization converters, e.g., the converters 515 and 415. In this embodiment, each converter converts at least part of the component of the signal resulting in an improved conversion. For example, the converter 515 can be used to convert TM mode to a hybrid mode having 50% TM polarization and 50% TE polarization. The converter 415 can be used to convert the hybrid mode to the TE mode.

Spatial Mode Converter

The spatial mode converters convert at least convert an order of the mode of the component of the optical signal. For example, the spatial mode converter can convert a second order component of the optical signal into a first order component. The spatial mode converter can include, but is not limited to, an asymmetric Y-shaped coupler, and asymmetric directional coupler. In some embodiments, the spatial converter converts the second order TE mode of the first component to the fundamental TE mode and splits the first and the second components of the optical signal into a first TE mode signal and a second TE mode signal. In those embodiments, the spatial converter is also a signal splitter.

Figure 7A:
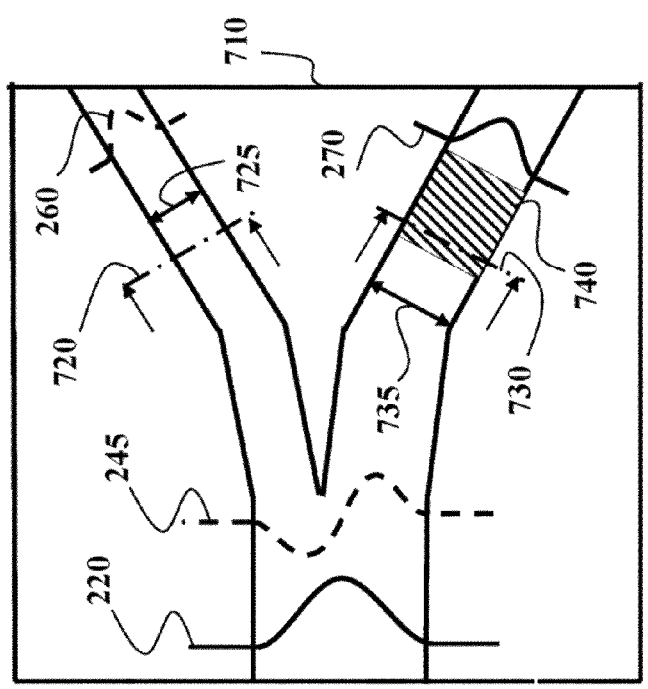
FIGS. 7A-C are schematics of a spatial mode converter according to one embodiment of the invention.
Figure 7B:
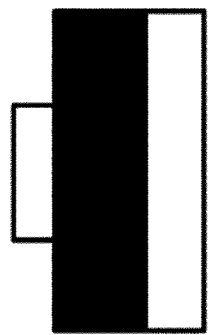
Figure 7C:
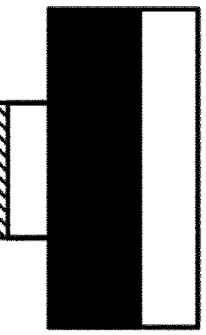

FIG. 7A shows a spatial mode converter 710 according one embodiment of the invention. The converter 710 is an asymmetric Y-coupler designed to convert the $TE_1$ mode 245 of the component of the optical signal to the $TE_0$ mode in a narrower upper branch 725 of the converter to produce the first TE mode signal 260 and to path the component in the $TE_0$ mode 220 in the wider lower branch 735 of Y-coupler producing the second TE mode signal 270, and, thus, splitting the input signal into two signals. To realize these functions, in one embodiment, the effective index of $TE_0$ in the upper branch of the Y-coupler is approximately equal to that of the input $TE_1$ mode, e.g., the output of polarization converter. FIGS. 7B and 7C show cross section of the converter 710 according the lines 720 and 730, respectively.

Generally, the asymmetric Y-coupler has a low insertion loss with high splitting ratio that benefits the polarization extinction ratio (PER) for polarization converter-splitter application. However, if the polarization conversion efficiency (PCE) for the polarization converter is less than 100%, then the input to the converter 710 can include the unconverted $TM_0$, e.g., output from the polarization converter, which can also be transmitted into the $TM_0$ mode in the lower branch, resulting in lower PER. To solve this problem, one embodiment of the invention includes an optional TE mode polarizer 740 integrated in the Y-coupler to filter out the $TM_0$ mode.

The TE polarizer 740 can be realized by depositing gold or other suitable material on the top of the lower Y-branch waveguide. In one variation of this embodiment, the gold TE polarizer is 100 nm thick.

FIG. 8A show another embodiment of the spatial mode converter designed as an asymmetric directional coupler 810. In this asymmetric directional coupler, two parallel waveguides, e.g., a first waveguide 820 and a second waveguide 830, are arranged closed to each other with a constant size gap 840 between the waveguides. The first waveguide 820 with a constant width is used as the input for the signal in the $TE_0$ and $TE_1$ modes. The second waveguide is tapered from narrow on an input side 831 to a wide on an output side 833. FIG. 8B shows a cross section of the converter 810 according the line 850.

The width on the input side of the second waveguide 830 is selected such that the effective index of the component of the signal in $TE_0$ mode entering the second waveguide is smaller than the effective index of the component in $TE_1$ mode in the first waveguide. The width of the output side 833 of the second waveguide is selected such that the effective index of component of the signal in $TE_0$ mode in the second waveguide is larger than the effective index of component in $TE_1$ mode in the first waveguide. The component of the signal in fundamental $TE_0$ mode at the input of the first waveguide propagates 825 along the first waveguide, and the component in the second order $TE_1$ mode at the input of the first waveguide gradually evolves 827 into the component in the $TE_0$ mode in the second waveguide.

Compound Converter

The compound converter is formed by a set of multiple mode-evolution converters, such as polarization and spatial mode converter described above. In some embodiments, the compound converter includes only polarization converters, or only spatial mode converters. In other embodiments, the compound converter includes both the polarization and spatial mode converters. In some other embodiments, the compound converter includes only mode-evolution converters. Also, in various embodiments, the mode-evolution converters can be connected directly, e.g., rigidly, or indirectly, e.g., operatively, with other waveguides. In various embodiments, the spatial mode converter can include signal splitters, as described above.

Figure 9:
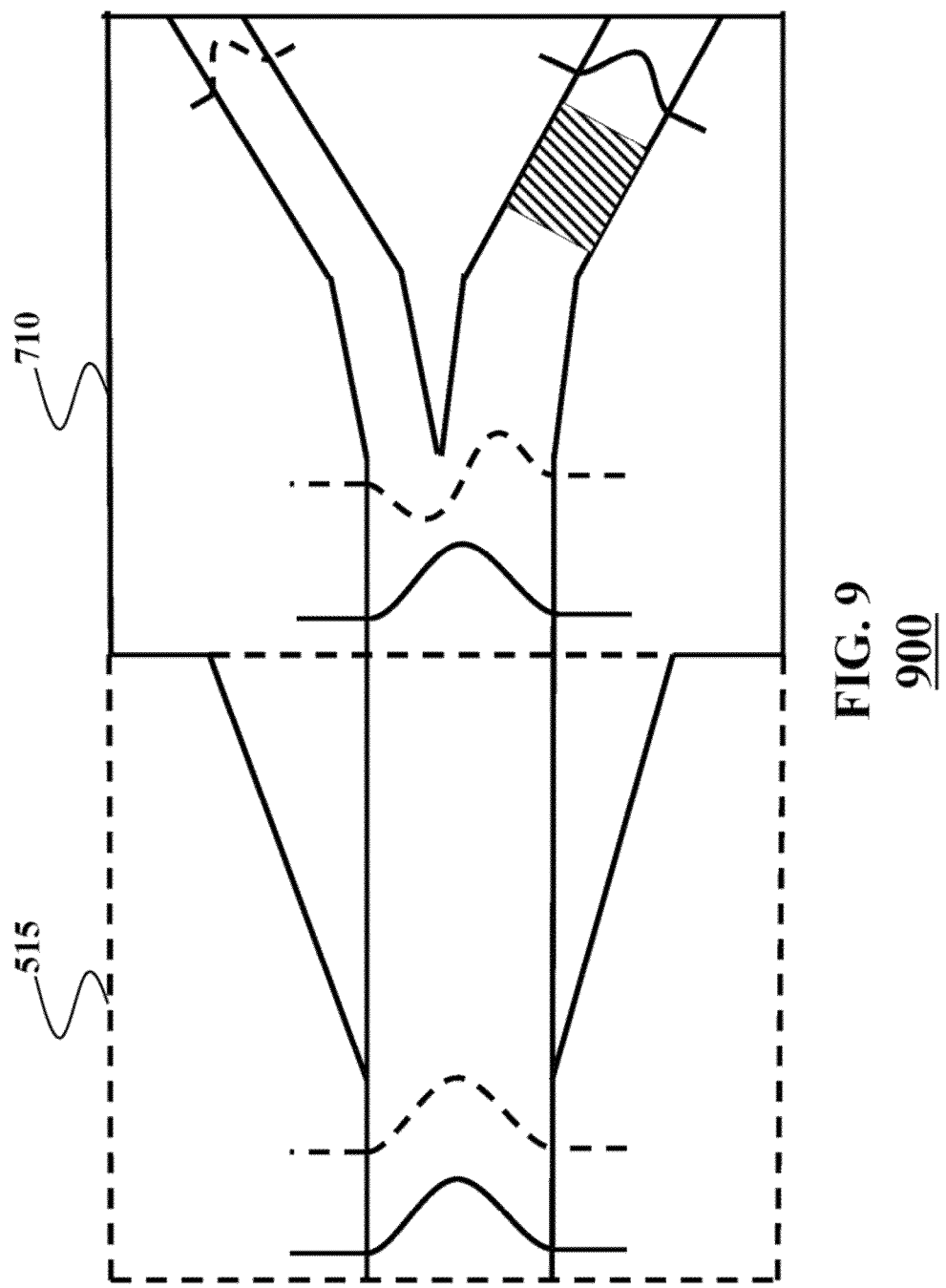
FIGS. 9-10 are schematics of compound converters according to some embodiment of the invention.

FIG. 9 shows an example of the compound converter 900. In this example, the bi-level taper 515 is connected to the asymmetric Y-coupler 710.

Figure 10:
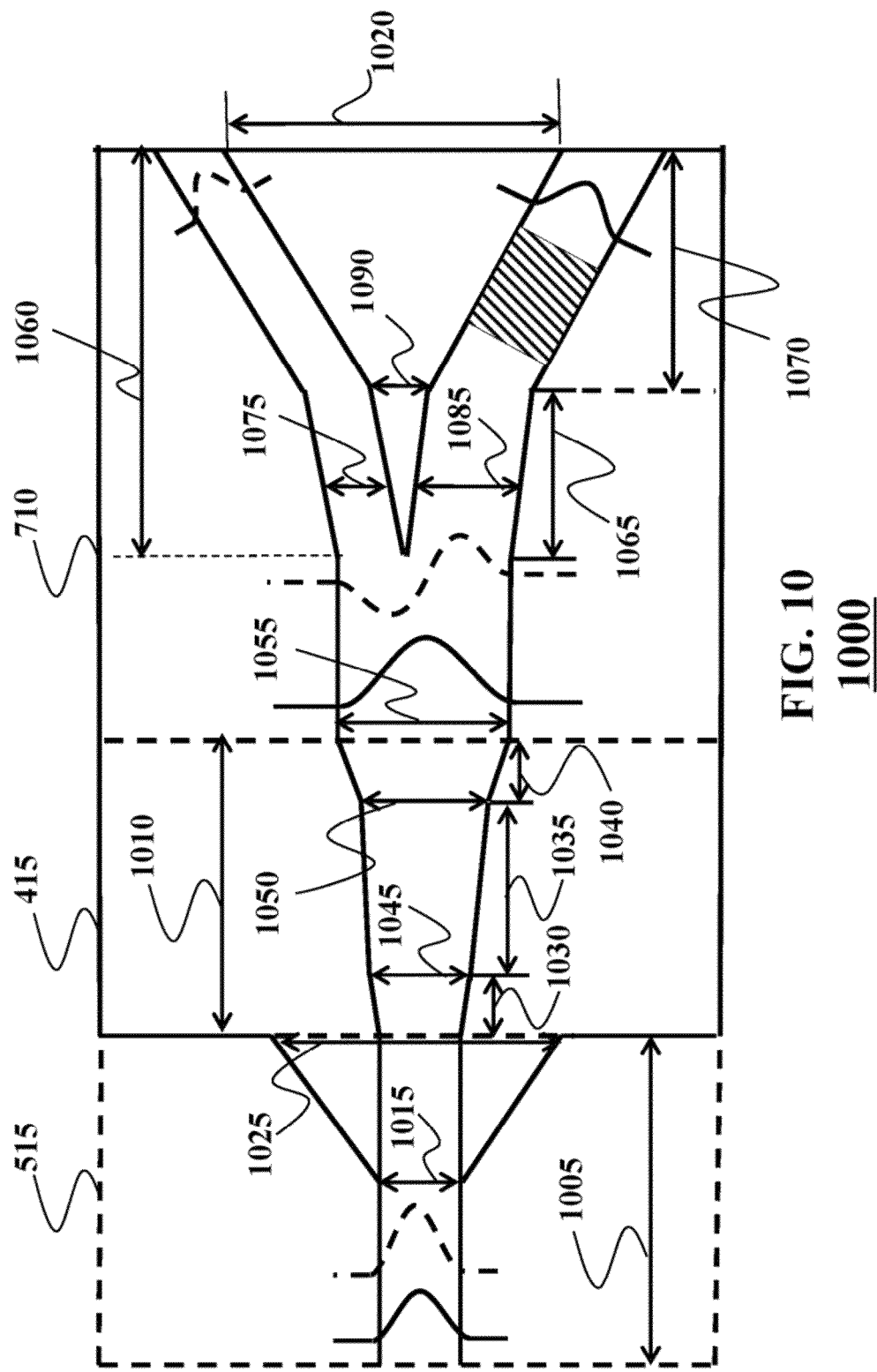

FIG. 10 shows another example of the compound converter 1000 including the bi-level taper 515, the taper 415 and the asymmetric Y-coupler 710. In this example, a bi-level taper and a width taper are combined to transform the $TM_0$ mode to the $TE_1$ mode without changing $TE_0$ mode.

The converters, such as converters 900 and 1000, can be fabricated in conventional IC fabrication processes including material epitaxial-growth, photolithography, dry and wet etching, thin film deposition. Also, the compound converters can have various dimensions. As a non-limiting example, the converter 1000 has the following structure and dimensions.

In one embodiment, the converter 1000 is designed on InP/InGaAsP structure including InP substrate, 370 nm thick InGaAsP core layer with As composition of 60% lattice matched to InP, and 170 nm thick InP upper cladding layer. In this embodiment, the width taper performs about 95% of the 90° polarization conversion and the bi-level taper performs about 5% of the polarization conversion. The bi-level taper can be produced by etching into the InGaAsP core layer, e.g., by 0.1 µm. The width taper can be produced by selectively etching through the InP upper cladding layer until reaching the InP/InGaAsP interface.

In this embodiment, the length 1010 of the bi-level taper 515 is 50 µm, the width 1015 for a higher level rib, i.e., the upper layer, is 2 µm, and the width 1025 of a lower level rib mask, i.e., the lower layer, varies from 1 µm to 6.5 µm. This design only requires accuracy of 0.5 µm to align masks for two etch levels. A three-section width converter can be used. For example, a first section length 1030 is 5 µm, having a width that varies from 2 µm to 2.3 µm 1045; the second section length 1035 is 707 µm, having a width that varies from 2.3 µm 1045 to 2.85 µm 1050; the third section length 1040 is 188 µm, having a width that varies from 2.85 µm 1050 to 3.1 µm 1055.

The asymmetric Y-coupler contains two sections with different branching angles. For both sections, the upper branch waveguide is 1 µm wide 1075 and the lower branch waveguide is 2.1 µm wide 1085. The first section is 260 µm long 1065, and the separation between two branches varies from 0 µm to 0.6 µm 1090. The second section is 140 µm long 1070, and the separation between two branches varies from 0.6 µm 1090 to 3.5 µm 1020. The integrated TE polarizer such as polarizer 740 is 10 µm long. The total length of the compound converter is 1350 µm.

Figure 11A:
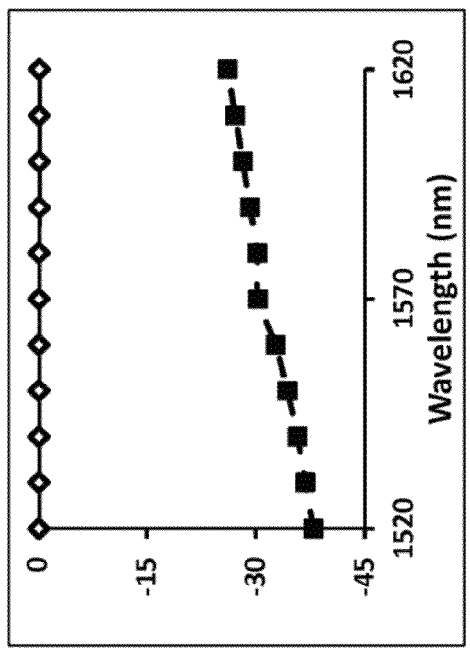
FIGS. 11A-B and 12A-B are graphs of normalized transverse electric and magnetic output powers.
Figure 11B:
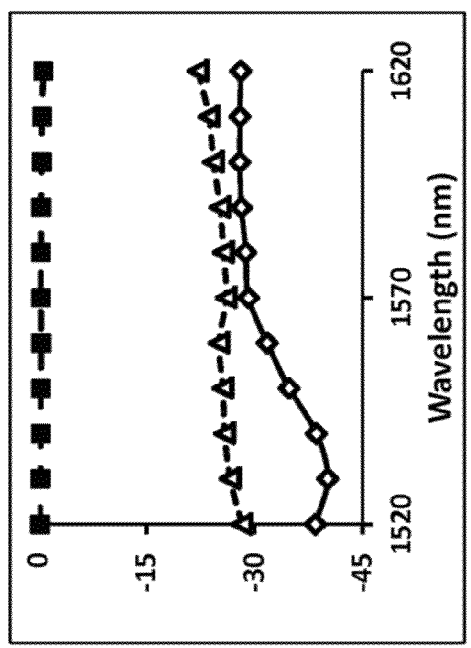

FIGS. 11A-B show the normalized $TE_0$ mode output power from the upper and lower Y-branches and the normalized $TM_0$ mode output power from the lower Y-branches as functions of wavelength from 1520 nm to 1620 nm excited by $TE_0$ mode input (FIG. 11A) and $TM_0$ mode input (FIG. 11B). For $TE_0$ mode input, the device has an insertion loss of 0.23 dB and PER of 25 dB over the entire C (1528-1567 nm)+L (1565-1612 nm) band. For $TM_0$ mode input, the device has an insertion loss of 0.62 dB and PER of 21 dB over the entire C+L band.

Figure 12A:
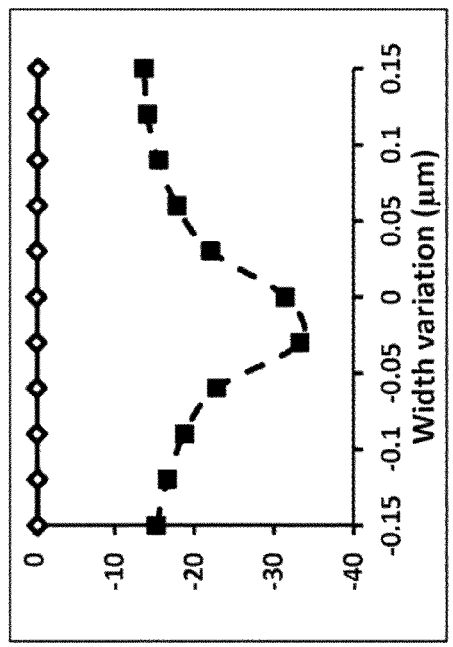
Figure 12B:
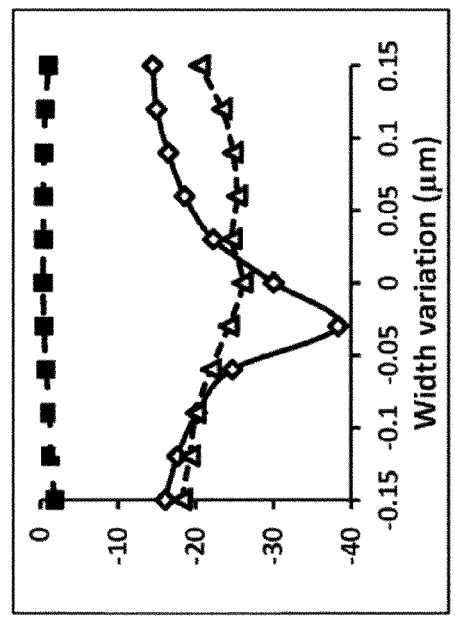

FIGS. 12A-B show the normalized $TE_0$ mode output power from the upper and lower Y-branches and the normalized $TM_0$ mode output power from the lower Y-branches as functions of waveguide width variation excited by $TE_0$ mode input (FIG. 12A) and $TM_0$ mode input (FIG. 12B) at the wavelength of 1570 nm. For $TE_0$ mode input, the device has an insertion loss below 0.39 dB and PER over 13 dB with respect to a width variation of +/−0.15 µm. For $TM_0$ mode, the device has an insertion loss below 1.8 dB and PER over 13 dB with respect to a width variation of +/−0.15 µm.

Reversing Conversion

The evolution-mode converters used to formed the compound converter can be used and/or modify to reverse the conversion. For example, the converters used as the polarization converter-splitter can be reversely used as polarization combiner-rotator.

Figure 13:
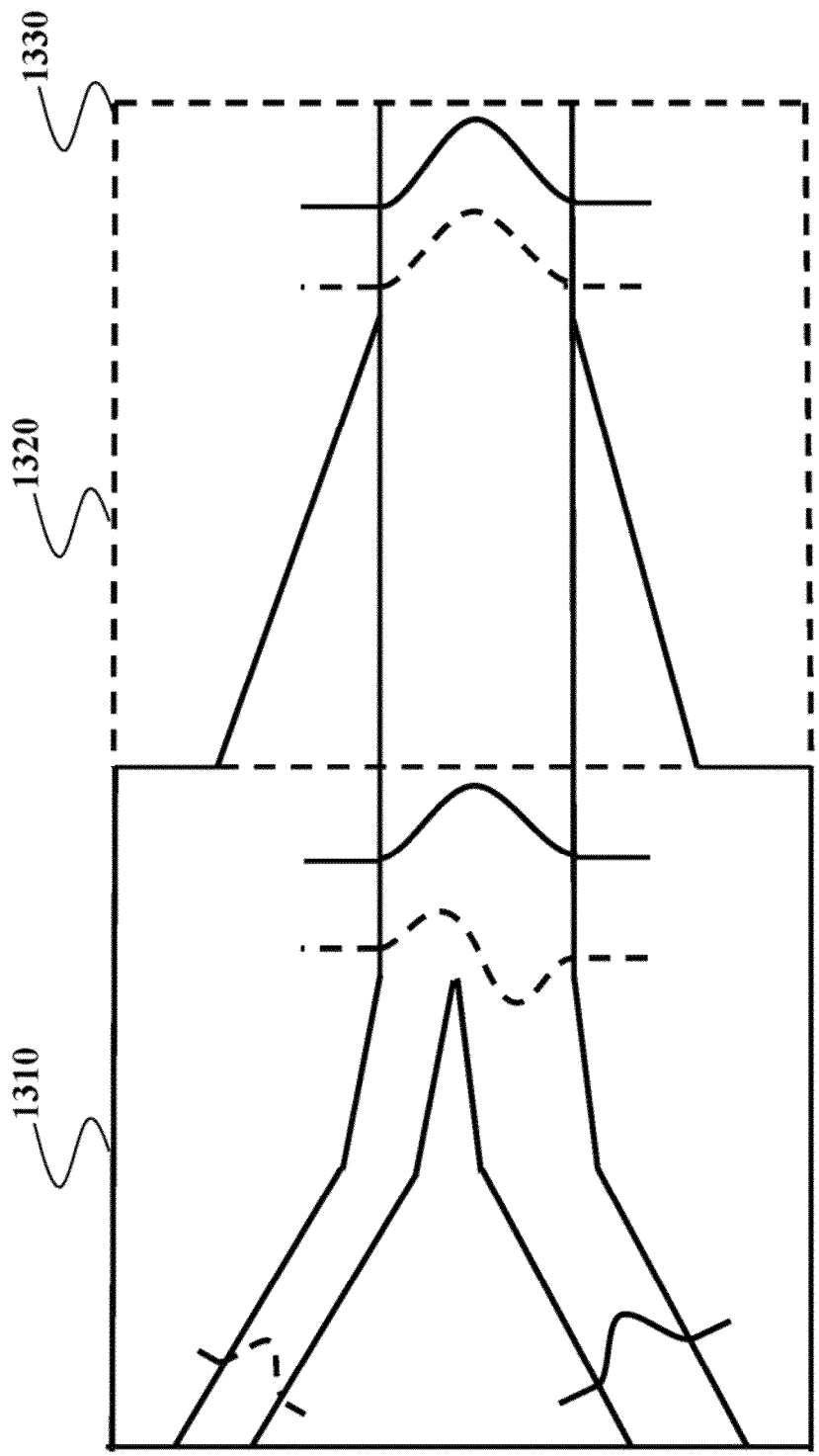
FIG. 13 is a schematic of a compound converter using reverse compound converter according one embodiment of the invention.

FIG. 13 shows the reverse use of the compound converter shown in FIG. 9. In this embodiment, both the first component at the upper Y-branch and the second component as the lower Y-branch have fundamental TE polarization. A reverse spatial converter 1310, e.g., a reverse Y-coupler, converts $TE_0$ mode of the first component into $TE_1$ mode without changing the second component. Similarly, a reverse polarization converter 1320, e.g., a reverse bi-level taper, converts the $TE_1$ mode of the first component into $TM_0$ mode without changing the second component.

In the embodiment shown in FIG. 13, the second order mode $TE_1$ may be supported at the output port of the device at line 1330. For example, if the second order $TE_1$ mode is converted to $TM_0$ mode, residual $TM_0$ mode may propagate together with both $TE_0$ and $TM_0$ modes, leading to low extinction ratio and unsatisfactory performance of polarization combiner. In order to improve the performance, higher order modes need to be removed from the exit port of the compound device. To that end, some embodiments of the invention include a high-order mode filter. After the filter, high-order modes are removed from the device and only two fundamental $TE_0$ and $TM_0$ modes are permitted.

FIG. 14 shows an example of a compound converter including a high-order mode filter. In this embodiment, a new section 1410 is added to the output port 1330 of device 1300. As shown in FIG. 14A, the compound converter 1400 includes a reverse spatial converter 1310, a reverser polarization converter 1320, and a high-order mode filter 1410. In this embodiment, the mode filter 1410 is realized by a taper section with reducing waveguide width from line 1420 to line 1430. At line 1420, one or more high-order modes of the optical signal are includes; at line 1430, only fundamental $TE_0$ and $TM_0$ modes are includes. FIG. 14B shows a cross-section of the mode filter at line 1420. Similarly, FIG. 14C shows a cross-section of the mode filter at line 1430. The upper layer waveguide 1450 has the same width 1440 of etched lower layer 1460. The width 1440 is gradually reduced in the mode filter 1410. At the output port at line 1430, the width of both upper layer waveguide 1450 and etched lower layer 1460 is reduced to 1470. By adding the mode filter 1410, the extinction ratio of the device is expected to improve significantly.

Figure 15:
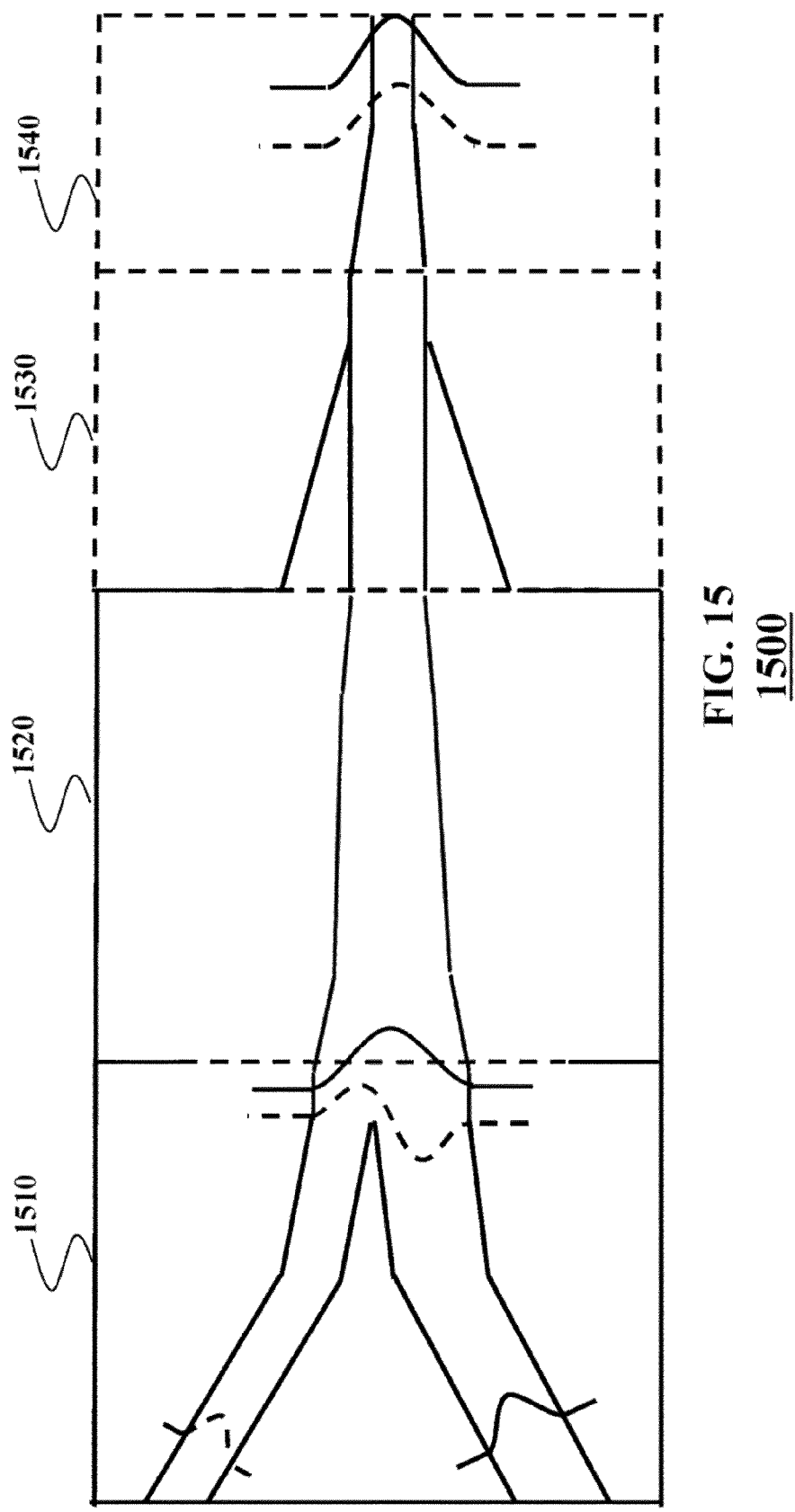
FIG. 15 is a schematic of a compound converter using a high-order mode filter according to another embodiment of the invention.

FIG. 15 shows another example of the compound converter. Specifically, FIG. 15 shows a polarization combiner-rotator based on compound converter shown in FIG. 10. In this embodiment, both the first component at the upper Y-branch and the second component as the lower Y-branch have fundamental TE polarization. A reverse spatial converter 1510, e.g., a reverse Y-coupler, converts $TE_0$ mode of the first component into TE mode without changing the second component. A reverse polarization converter converts the $TE_1$ mode of the first component into $TM_0$ mode without changing the second component. In this embodiment, the polarization converter is a combination of two parts, i.e., a reverse width taper 1520, and a reverse bi-level taper 1530. In addition, a high-order mode filter 1540 is added to remove the high-order modes, in particular the $TE_1$ mode. In the mode filter 1540, the waveguide width is decreased linearly from 2 um to 1.2 um over a length of 100 um. At the output of the device 1500, the fundamental TE mode of the first component is converted to fundamental TM mode; the polarization of fundamental TE mode of the second component is maintained; furthermore, the fundamental modes TE and TM are combined and propagate together.

Figure 16A:
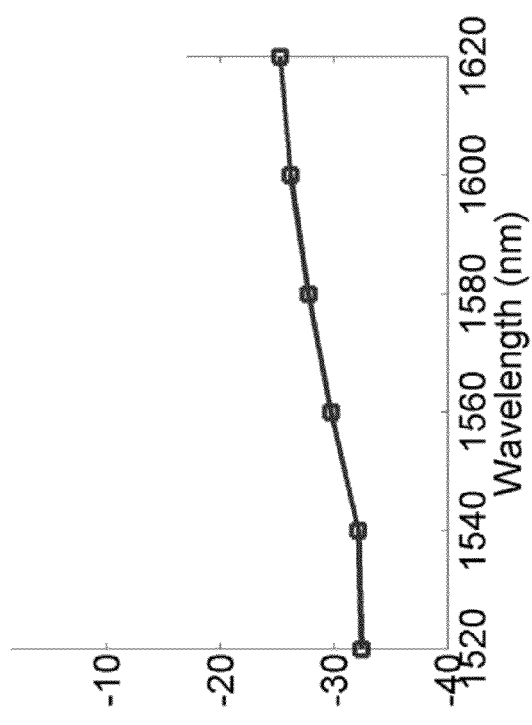
FIGS. 16A-B are graphs of normalized transverse electric and magnetic output powers with different input component.
Figure 16B:
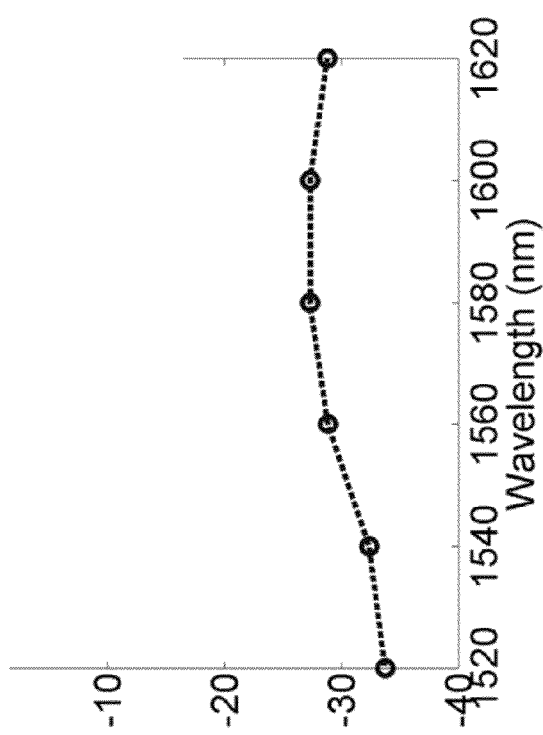

FIGS. 16A-B shows the normalized $TE_0$ mode and $TM_0$ mode power at the output of the device shown in FIG. 15 as a function of wavelength from 1520 nm to 1620 nm, when excited by fundamental TE mode of the first component of the Y-branch (FIG. 16A) and fundamental TE mode of the second component of the Y-branch (FIG. 16B). When the device is excited by fundamental TE mode of the first component of the Y-branch, the mode is converted to $TM_0$ mode at output port with insertion loss less than 0.83 dB and extinction ratio larger than 24 dB. When the device is excited by fundamental TE mode of the second component of the Y-branch, the mode is maintained as $TE_0$ mode at output port with insertion loss less than 0.1 dB and extinction ratio larger than 27 dB.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A mode-evolution compound converter for processing an optical signal, wherein the optical signal includes a first component having a transverse magnetic (TM) mode and a second component having a fundamental transverse electric (TE) mode, comprising:
a set of converters connected to form the compound converter, wherein each converter in the set is a mode-evolution converter selected from a group including a polarization converter, a spatial converter, and combination thereof, wherein the polarization converter at least converts a mode of a polarization of at least one component of the optical signal, and the spatial mode converter at least converts a spatial mode order of at least one component of the optical signal, and wherein the spatial converter includes an asymmetric Y-shaped coupler having a narrower branch and a wider branch, wherein a width of the narrower branch is less than a width of the wider branch and selected for splitting the components of the optical signal and for converting the spatial mode order of at least one component of the optical signal, wherein the narrower and the wider branches are connected such that a distance between the narrower and the wider branches is increasing gradually from a common point of the narrower and the wider branches in a direction of a propagation of the optical signal.

2. The compound converter of claim 1, wherein the polarization converter converts the fundamental TM mode of the first component into a second order TE mode.

3. The compound converter of claim 1, wherein the polarization converter includes a taper, which is narrower at an input side and wider at an output side.

4. The compound converter of claim 1, wherein the polarization converter includes a bi-level taper.

5. The compound converter of claim 1, wherein the polarization converter includes a width taper and a bi-level taper.

6. The compound converter of claim 1, wherein the spatial converter converts a second order component of the optical signal into a first order component.

7. The compound converter of claim 1, wherein the polarization converter is integrated with the spatial converter.

8. The compound converter of claim 7, wherein the polarization converter includes a shallow etched width taper.

9. The compound converter of claim 1, further comprising:
a reverse spatial converter for converting the fundamental TE mode of at least one component into the second order TE mode; and
a reverse polarization converter for converting the second order TE mode of the component into the fundamental TM mode.

10. The compound converter of claim 9, further comprising:
a high-order mode filter for removing high order modes of the optical signal.

11. A mode-evolution compound converter for converting an optical signal including a first component having a fundamental transverse magnetic (TM) mode and a second component having a fundamental transverse electric (TE) mode, comprising:
a polarization converter for converting the fundamental TM mode of the first component into a second order TE mode; and
a spatial converter for converting the second order TE mode of the first component into the fundamental TE mode and for splitting the first and the second components of the optical signal into a first TE mode signal and a second TE mode signal, wherein the polarization converter includes a shallow etched width taper and the spatial converter includes an asymmetric Y-shaped coupler.

12. The compound converter of claim 11, wherein the asymmetric Y-shaped coupler includes a TE mode polarizer.

13. The compound converter of claim 12, wherein the TE mode polarizer includes gold.

14. The compound converter of claim 11, further comprising:
a reverse spatial converter for converting the fundamental TE mode of at least one component into the second order TE mode; and a reverse polarization converter for converting the second order TE mode of the component into the fundamental TM mode.

15. A mode-evolution compound converter for processing an optical signal, wherein the optical signal includes a component having a fundamental transverse magnetic (TM) mode, comprising:
a set of multiple converters connected to form a compound converter, wherein each converter is a mode-evolution converter selected from a group including a polarization converter, a spatial converter, a reverse polarization converter, a reverse spatial converter, a high-order mode filter and combination thereof, wherein the polarization converter and the reverse polarization converter at least converts a mode of a polarization of at least one component of the optical signal, and the spatial mode converter and the reverse spatial mode converter at least converts a spatial mode order of at least one component of the optical signal, wherein the spatial mode converter includes an asymmetric Y-shaped coupler, wherein a width of the narrower branch is less than a width of the wider branch, and wherein the narrower and the wider branches originate from a common point and a distance between the narrower and the wider branches is increasing gradually from the common point in a direction of a propagation of the optical signal.

16. The compound converter of claim 15, wherein the polarization converter converts the fundamental TM mode of the component of the optical signal into a second order transverse electric (TE) mode, wherein the spatial mode converter converts the second order TE mode of the component a fundamental TE mode, wherein the reverse spatial converter converts a fundamental transverse electric (TE) mode of the component into the second order TE mode, and wherein the reverse polarization converter converts the second order TE mode of the component into the fundamental TM mode.

17. The compound converter of claim 15, wherein each converter includes a substrate selected from a group consisting of an indium phosphide (InP) substrate, a silica substrate, and a silicon substrate.

* * * * *